United States Patent
Park et al.

(10) Patent No.: US 7,902,910 B2
(45) Date of Patent: Mar. 8, 2011

(54) BOOSTED VOLTAGE GENERATOR FOR INCREASING BOOSTING EFFICIENCY ACCORDING TO LOAD AND DISPLAY APPARATUS INCLUDING THE SAME

(75) Inventors: Sung-Jin Park, Seoul (KR); Jung Bong Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/355,329

(22) Filed: Jan. 16, 2009

(65) Prior Publication Data

US 2009/0184751 A1  Jul. 23, 2009

(30) Foreign Application Priority Data

Jan. 21, 2008  (KR) .................. 10-2008-0006125

(51) Int. Cl.
*G05F 1/10* (2006.01)
*G05F 3/02* (2006.01)
(52) U.S. Cl. ............ 327/536; 327/538; 327/540; 363/60
(58) Field of Classification Search .................. 327/148, 327/157, 530, 534–543, 546; 323/312–317; 363/59, 60
See application file for complete search history.

(56) References Cited

U.S. PATENT DOCUMENTS

| 5,526,253 | A | * | 6/1996 | Duley | ............................. 363/59 |
| 2005/0047181 | A1 | * | 3/2005 | Yamamoto et al. | ............. 363/60 |
| 2005/0057300 | A1 | * | 3/2005 | Ishii | ............................. 327/536 |
| 2008/0036529 | A1 | * | 2/2008 | Ishiyama | ..................... 327/536 |

FOREIGN PATENT DOCUMENTS

| JP | 2005-080395 | 3/2005 |
| JP | 2006-162645 | 6/2006 |
| KR | 1020050029813 A | 3/2005 |
| KR | 1020050106578 A | 11/2005 |

* cited by examiner

*Primary Examiner* — Lincoln Donovan
*Assistant Examiner* — Brandon S Cole
(74) *Attorney, Agent, or Firm* — F. Chau & Associates, LLC

(57) ABSTRACT

A boosted voltage generator for increasing boosting efficiency according to the amount of load and display apparatus including the same are provided. The boosted voltage generator includes an input voltage generator configured to generate a first input voltage or a second input voltage based on a reference voltage, compare the reference voltage with a feedback boosted voltage fed back based on the amount of load at an output terminal, and output a comparison result; and a booster configured to boost the first or second input voltage using at least one external capacitor based on the comparison result and output a boosting result as a boosted voltage to the output terminal. The boosted voltage generator and the display apparatus including the same can increase the boosting efficiency according to the amount of load.

18 Claims, 12 Drawing Sheets

FIG. 7

| REGISTER | Function | |
|---|---|---|
| | H | L |
| STB_DSTB | Standby | Operation |
| PON | AVDD3 On | AVDD3 Off |
| AV_VCI1 | VCI | VCI1 |
| HLOAD | High load panel | Low load panel |

FIG. 8

|  | STB_DSTB | PON | AB_VCI1 | HLOAD | FB_CONT/AMP_CONT | INPUT TO BOOSTER |
|---|---|---|---|---|---|---|
| TD1 | 0 | 0 | 0 | 0 | 1 | X |
| TD2 | 0 | 0 | 0 | 1 | 1 | X |
| TD3 | 0 | 0 | 1 | 0 | 1 | X |
| TD4 | 0 | 0 | 1 | 1 | 1 | X |
| TD5 | 0 | 1 | 0 | 0 | 1 | VCI1 |
| TD6 | 0 | 1 | 0 | 1 | 1 | VCI1 |
| TD7 | 0 | 1 | 1 | 0 | 1 | VCI |
| TD8 | 0 | 1 | 1 | 1 | 0 | VCI |
| TD9 | 1 | X | X | X | 1 | X |

FIG. 10

| | VCI = 3.0V AVDD3 Target = 5.52V | | | |
|---|---|---|---|---|
| Iavdd | AB_VCI1=L HLOAD = L Low load panel | | AB_VCI1=H HLOAD = H High load panel | |
| | AVDD3 | % | AVDD3 | % |
| 0m | 5.520 | 100.00 | 5.520 | 100.00 |
| 1m | 5.420 | 98.188 | 5.510 | 99.819 |
| 2m | 5.342 | 96.775 | 5.503 | 99.692 |
| 3m | 5.260 | 95.290 | 5.498 | 99.601 |
| 4m | 5.180 | 93.841 | 5.490 | 99.457 |
| 5m | 5103 | 92.446 | 5.480 | 99.275 |
| 6m | 5.023 | 90.996 | 5.396 | 97.754 |
| 7m | 4.945 | 89.583 | 5.297 | 95.960 |
| 8m | 4.866 | 88.152 | 5.194 | 94.094 |
| 9m | 4.787 | 86.721 | 5.091 | 92.228 |
| 10m | 4.707 | 85.272 | 4.988 | 90.362 |

BOOSTED VOLTAGE GENERATOR FOR INCREASING BOOSTING EFFICIENCY ACCORDING TO LOAD AND DISPLAY APPARATUS INCLUDING THE SAME

CROSS-REFERENCE TO RELATED APPLICATION

This application claims priority under 35 U.S.C. §119 of Korean Patent Application No. 10-2008-0006125, filed Jan. 21, 2008, the disclosure of which is incorporated herein by reference

BACKGROUND

1. Technical Field

The present disclosure relates to technology of generating a boosted voltage, and, more particularly, to a boosted voltage generator for increasing boosting efficiency according to the amount of load and a display apparatus including the same.

2. Discussion of Related Art

A thin film transistor liquid crystal display (TFT-LCD) is a representative flat panel display device and is widely used in televisions, monitors, mobile phones, and so on. A display driver IC (DDI) used in the TFT-LCD includes a boosted voltage generator to generate a driving voltage, for example, a common voltage for a source driver or a gate driver of the TFT-LCD.

The driving voltage may vary with the amount of display panel load. Conventionally, boosted voltage generators output a predetermined boosted voltage regardless of the amount of display panel load, whereby the efficiency of the boosted voltage is low. Recently, as quarter video graphics array (QVGA)-TFT products increase, a DDI including a boosted voltage generator for generating a stable driving voltage according to various amounts of display panel load is desired.

SUMMARY

Exemplary embodiments of the present invention provide a boosted voltage generator for increasing boosting efficiency according to the amount of load and a display apparatus including the same.

According to exemplary embodiments of the present invention, there is provided a boosted voltage generator including an input voltage generator configured to generate a first input voltage or a second input voltage based on a reference voltage, to compare the reference voltage with a feedback boosted voltage that is fed back based on the amount of load at an output terminal, and to output a comparison result; and a booster configured to boost the first or second input voltage using at least one external capacitor based on the comparison result and output a boosting result as a boosted voltage to the output terminal.

According to exemplary embodiments of the present invention, there is provided a display apparatus including a display panel comprising a plurality of source lines and a plurality of gate lines; and a display panel driving unit including a source driver configured to drive a source line among the plurality of source lines and a power supply unit including a boosted voltage generator configured to generate at least one boosted voltage needed by the source driver to drive the source line. The boosted voltage generator includes an input voltage generator configured to generate a first input voltage or a second input voltage based on a reference voltage, to compare the reference voltage with a feedback boosted voltage fed back based on the amount of load at an output termi-nal, and to output a comparison result; and a booster configured to boost the first or second input voltage using at least one external capacitor based on the comparison result and to output a boosting result as a boosted voltage to the output terminal.

BRIEF DESCRIPTION OF THE DRAWINGS

Exemplary embodiments of the present invention will be understood in more detail from the following descriptions taken in conjunction with the attached drawings, in which:

FIG. 7 is a table showing the definitions of control signals input to the controller shown in FIG. 5;

FIG. 8 is a logic table showing the operations of the boosted voltage generator illustrated in FIG. 5;

FIG. 10 shows simulation results of an output voltage according to a load current in the boosted voltage generator illustrated in FIG. 5;

DETAILED DESCRIPTION OF EXEMPLARY EMBODIMENTS

Figure 1:
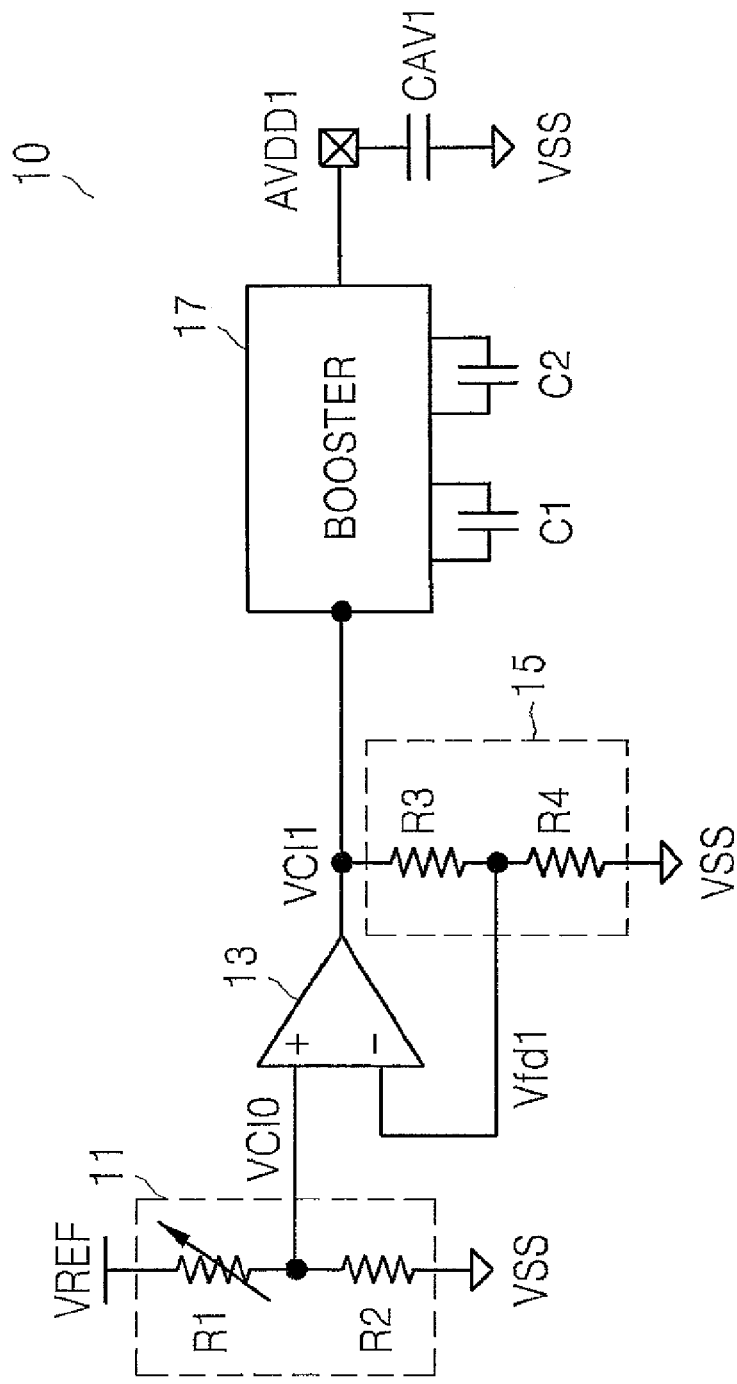
FIG. 1 is a block diagram of a conventional boosted voltage generator for comparison with an exemplary embodiment of the present invention.

This application claims priority under 35 U.S.C. §119 to Korean Patent Application No. 10-2008-0006125, filed on Jan. 21, 2008, the disclosure of which is incorporated by reference herein.

The present invention now will be described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those of ordinary skill in the art. In the drawings, the size and relative sizes of layers and regions may be exaggerated for clarity. Like numbers refer to like elements throughout.

FIG. 1 is a block diagram of a conventional boosted voltage generator 10 for comparison with an exemplary embodiment of the present invention. Referring to FIG. 1, the boosted voltage generator 10 includes a reference voltage generator 11, an amplifier 13, a resistive divider 15, a booster 17, and first, second, and third external capacitors C1, C2, and CAV1, respectively.

The reference voltage generator 11 generates a reference voltage VCI0 using a variable resistor R1 and a fixed resistor R2, which are connected in series between a first voltage VREF1 and a second voltage VSS. The amplifier 13 amplifies a difference between the reference voltage VCI0 and a feedback input voltage Vfd1 and outputs an amplified voltage as an input voltage VCI1. The resistive divider 15 performs resistive division of the input voltage VCI1 using a first resistor R3 and a second resistor R4, which are connected in series between an output terminal of the amplifier 13 and the second voltage VSS' and outputs a resistively divided voltage as the feedback input voltage Vfd1. The booster 17 boosts the input voltage VCI1 using the first and second external capacitors C1 and C2 and outputs a boosted voltage AVDD1 at an output to which is connected the third external capacitor CAV1 connected to the second voltage VSS.

The boosted voltage generator 10 illustrated in FIG. 1 has an advantage of a simple circuit structure but has a problem in that the efficiency of the boosted voltage AVDD1 decreases with an increase of load current when a display panel is a high-load panel that requires a large load current.

Figure 2:
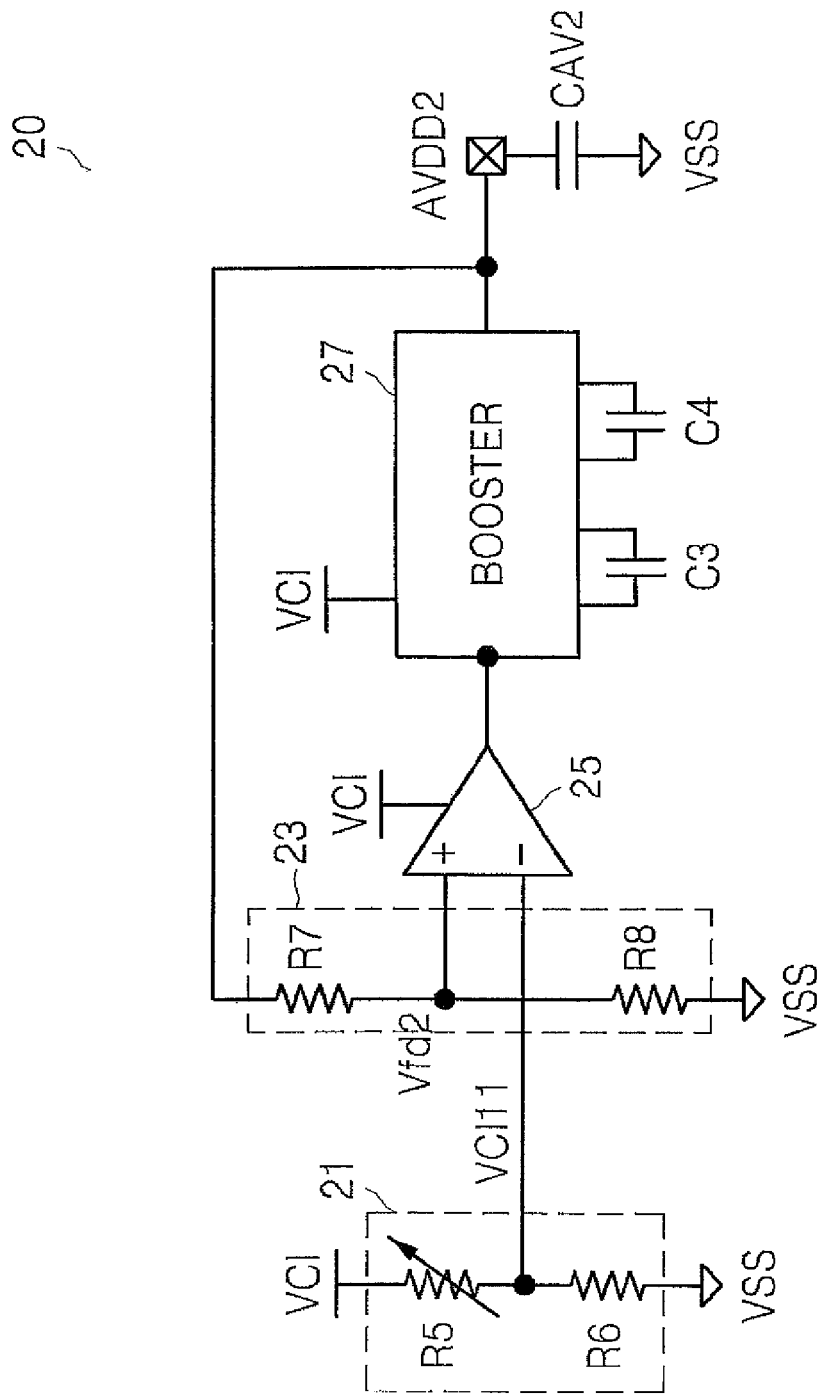
FIG. 2 is a block diagram of a conventional boosted voltage generator for comparison with an exemplary embodiment of the present invention.

FIG. 2 is a block diagram of another conventional boosted voltage generator 20 for comparison with an exemplary embodiment of the present invention. The boosted voltage generator 20 includes a reference voltage generator 21, a resistive divider 23, a comparator 25, a booster 27, and first, second, and third external capacitors C3, C4, and CAV2, respectively. The reference voltage generator 21 generates a reference voltage VCI11 using a variable resistor R5 and a fixed resistor R6, which are connected in series between a first voltage VCI and a second voltage VSS. The resistive divider 23 performs resistive division of a boosted voltage AVDD2 using a first resistor R7 and a second resistor R8 and outputs a resistively divided voltage as a feedback boosted voltage Vfd2. The comparator 25 compares the reference voltage VCI11 with the feedback boosted voltage Vfd2 and outputs a comparison result. The booster 27 boosts the first voltage VCI using the first and second external capacitors C3 and C4 based on the comparison result and outputs the boosted voltage AVDD2 at an output to which is connected the third external capacitor CAV2 connected to the second voltage VSS.

Figure 3:
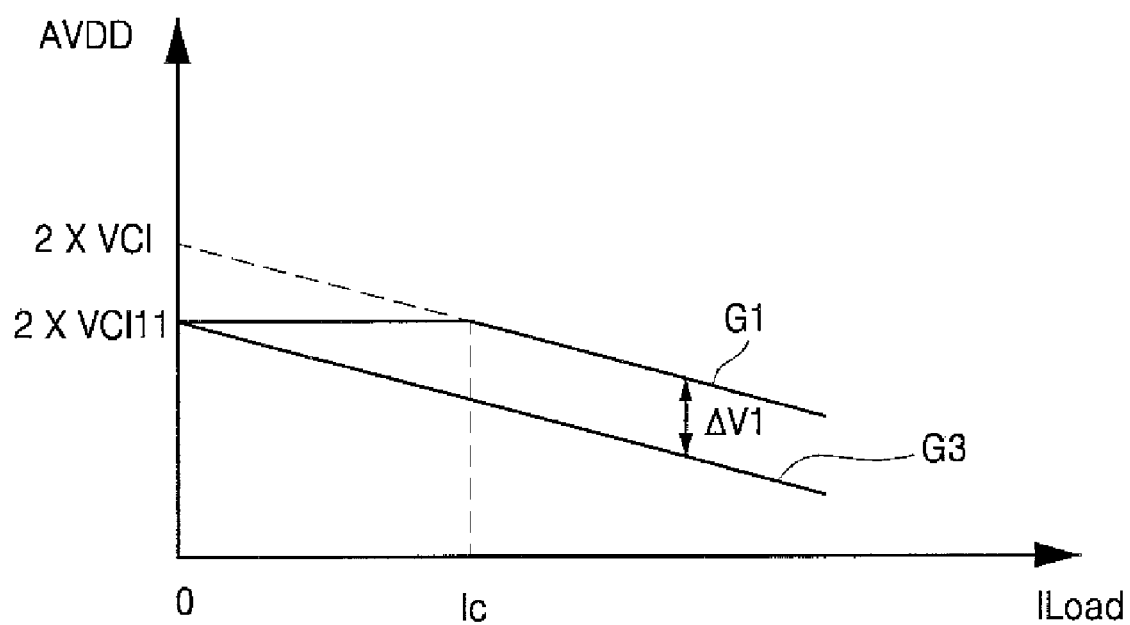
FIG. 3 is a graph of output voltage versus load current in the boosted voltage generators illustrated in FIGS. 1 and 2.
Figure 4:
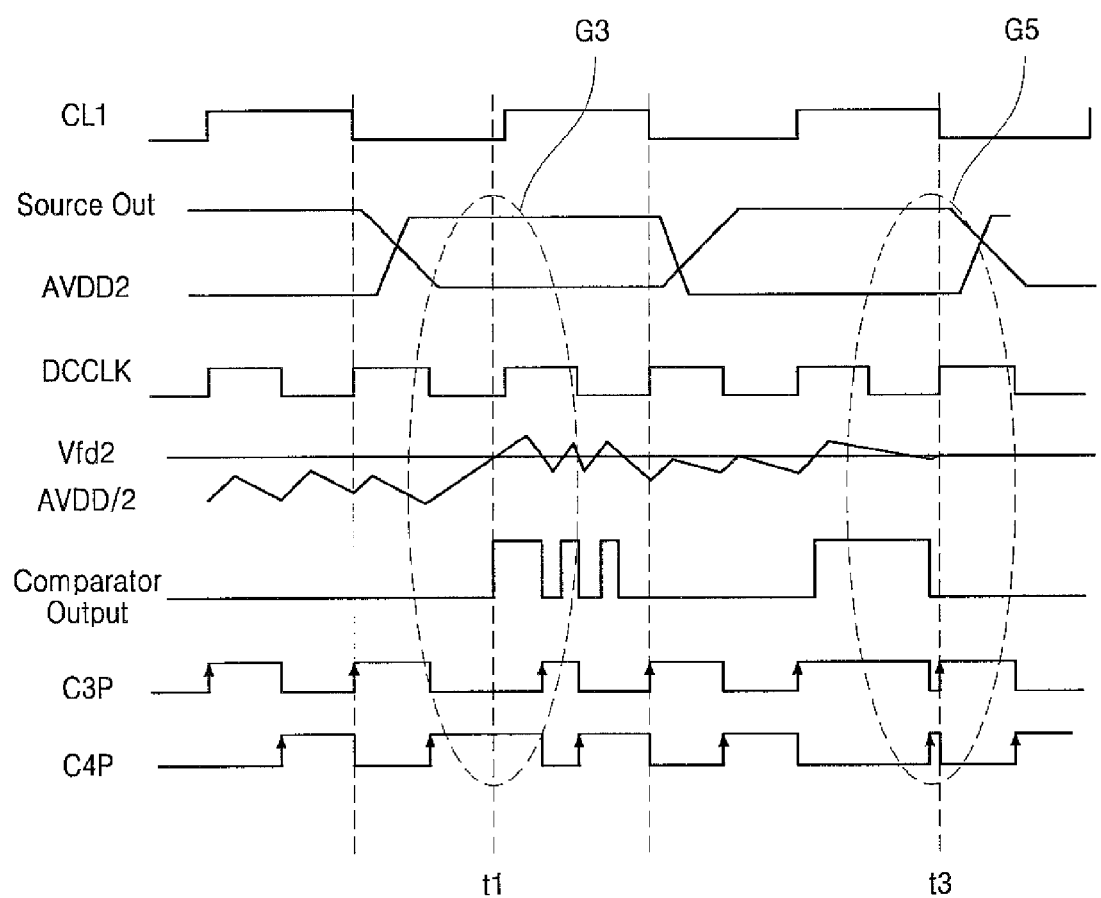
FIG. 4 is a timing chart illustrated to explain display noise occurring in the boosted voltage generator illustrated in FIG. 2.

FIG. 3 is a graph of output voltage versus load current in the conventional boosted voltage generators 10 and 20 illustrated in FIGS. 1 and 2. FIG. 4 is a timing chart used to explain display noise occurring in the boosted voltage generator 20 illustrated in FIG. 2.

Referring to FIGS. 1 through 4, "G1" denotes a plot of the output voltage AVDD2 of the boosted voltage generator 20 illustrated in FIG. 2 and "G3" denotes a plot of the output voltage AVDD1 of the boosted voltage generator 10 illustrated in FIG. 1. While the boosted voltage generator 20 of FIG. 2 maintains a certain boosted voltage for example, AVDD2=2*VCI1, until a load current ILoad reaches a threshold current Ic, the output voltage AVDD1 of the boosted voltage generator 10 of FIG. 1 constantly decreases as the load current ILoad increases. In other words, when a display panel is a high load panel, the boosted voltage generator 20 of FIG. 2 is more efficient than the boosted voltage generator 10 of FIG. 1.

When a display panel is a low load panel, however, that is, when a display panel only requires a small amount of load current, the boosted voltage generator 20 may cause display noise, for example, which may result in the flicker effect. For instance, in a case where the boosted voltage AVDD2 output from the boosted voltage generator 20 has an opposite polarity to a voltage Source Out from a source line, as illustrated in FIG. 4, and is used for phase inversion to prevent the degradation of liquid crystals, if an output voltage C3P of the first external capacitor C3 and an output voltage C4P of the second external capacitor C4 are not synchronized with an operating clock DCCLK of the booster 27, for example, at t1 and t3, the flicker effect may occur on the display panel.

Figure 5:
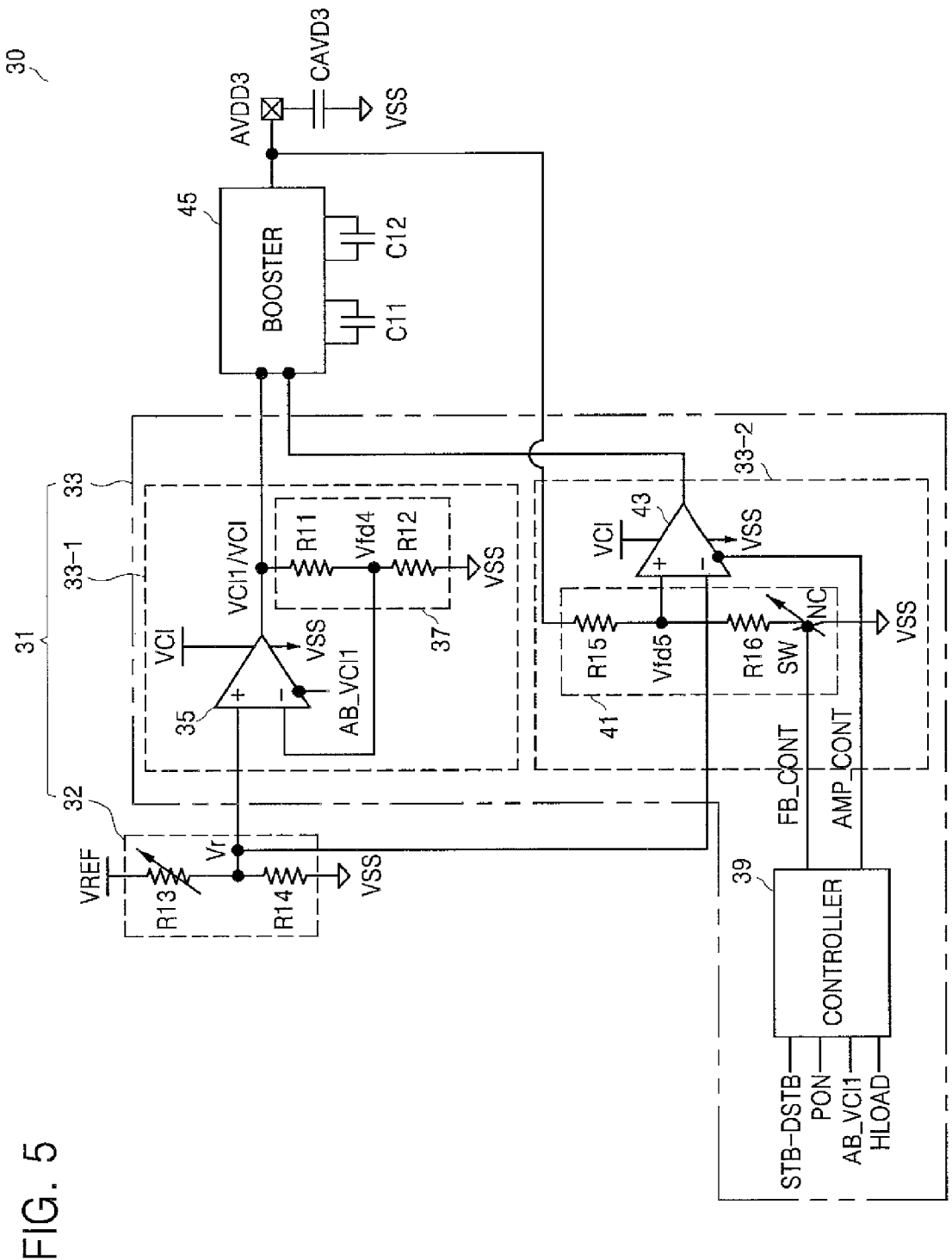
FIG. 5 is a block diagram of a boosted voltage generator according to an exemplary embodiment of the present invention.
Figure 6:
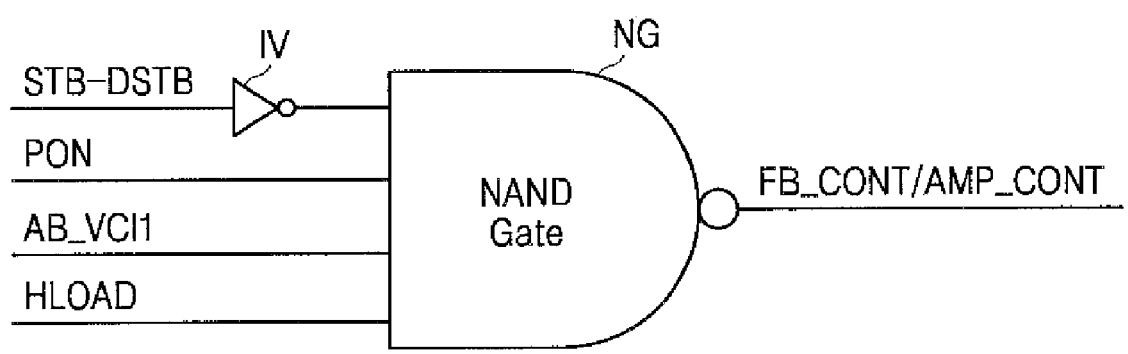
FIG. 6 is a circuit diagram of a controller shown in FIG. 5.

FIG. 5 is a block diagram of a boosted voltage generator 30 according to an exemplary embodiment of the present invention. FIG. 6 is a circuit diagram of a controller 39 shown in FIG. 5. Referring to FIGS. 5 and 6, the boosted voltage generator 30, which may be implemented in a flat display apparatus using a thin film transistor liquid crystal display (TFT-LCD), a plasma display panel (PDP), or an organic light-emitting diode (OLED), may include an input voltage generator 31, a booster 45, and first, second, and third external capacitors C11, C12, and CAVD3, respectively.

The input voltage generator 31 may generate a first input voltage VCI1 or a second input voltage VCI fed to a booster 45 based on a reference voltage Vr, and also compares the reference voltage Vr with a feedback boosted voltage Vfd5 that is based on the amount of load at an output terminal AVDD3, and output a comparison result fed to the booster 45. The input voltage generator 31 may include a reference voltage generator 32 and an input voltage generation block 33.

The reference voltage generator 32 may generate the reference voltage Vr based on a first voltage VREF. For instance, the reference voltage generator 32 may generate the reference voltage Vr using a variable resistor R13 and a fixed resistor R14, which are connected in series between the first voltage VREF and a second voltage VSS, for example, a ground voltage.

The input voltage generation block 33 may amplify a difference between the reference voltage Vr and a first feedback input voltage Vfd4 and outputs the first input voltage VCI1 corresponding to a voltage swinging between the second input voltage VCI and the second voltage VSS or may output the second input voltage VCI in response to an input voltage control signal AB_VCI1. In addition, the input voltage generation block 33 may compare the feedback boosted voltage Vfd5 with the reference voltage Vr and output a comparison result to the booster 45 in response to a comparison control signal FB_CONT from a controller 39.

Figure 11:
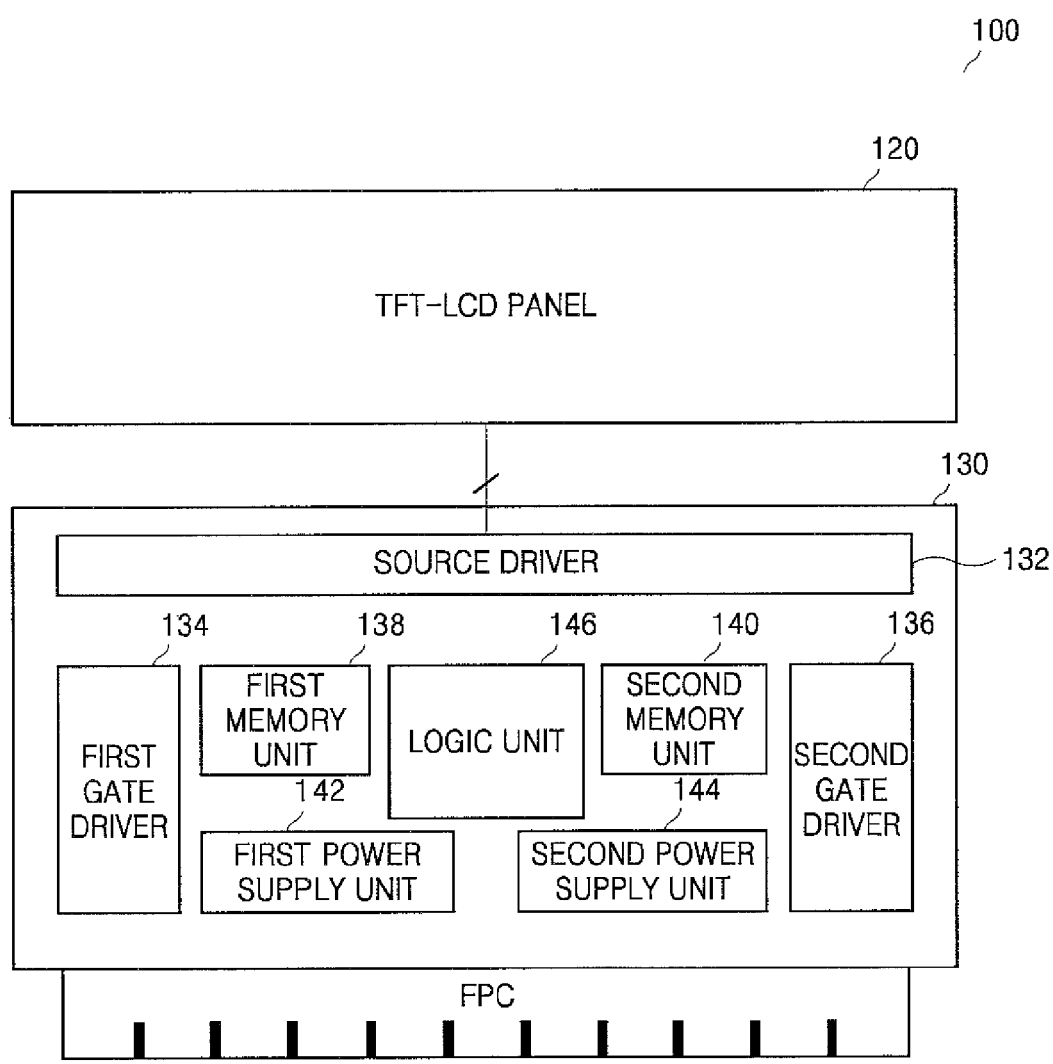
FIG. 11 is a block diagram of a display apparatus including the boosted voltage generator illustrated in FIG. 5.

The comparison control signal FB_CONT is a signal that enables the operation of a comparison block, which will be described hereinbelow, and may be output by the controller 39, which will also be described hereinbelow, based on the input voltage control signal AB_VCI1 and a load detection signal HLOAD. The load detection signal HLOAD is a signal having a logic level corresponding to a load, for example, of a TFT-LCD panel 120 illustrated in FIG. 11. The load detection signal HLOAD may have a first logic level, for example, a high level of "1", when the load is greater than a reference load and may have a second logic level, for example, a low level of "0", when the load is less than the reference load. In other words, the load detection signal HLOAD is a signal indicating or informing whether the load of, for example, the TFT-LCD panel 120 illustrated in FIG. 11, is high or low based on the reference load.

The input voltage generation block 33 may include a voltage generation block 33-1, a comparison block 33-2, and the controller 39. The voltage generation block 33-1 may amplify the difference between the reference voltage Vr and the first feedback input voltage Vfd4 and output the first input voltage VCI1 corresponding to a voltage swinging between the second input voltage VCI and the second voltage VSS or may output the second input voltage VCI in response to the input voltage control signal AB_VCI1. The voltage generation block 33-1 may include an amplifier 35 and a first resistive divider 37.

The amplifier 35 may amplify the difference between the reference voltage Vr and the first feedback input voltage Vfd4 and output the first input voltage VCI1 corresponding to a voltage swinging between the second input voltage VCI and the second voltage VSS or may output the second input voltage VCI in response to the input voltage control signal AB_VCI1 fed thereto. The first resistive divider 37 may perform resistive division of an output voltage, for example, the first input voltage VCI1 of the amplifier 35 or the second input voltage VCI and output a resistively divided voltage as the first feedback input voltage Vfd4. The first resistive divider 37 may include one or more resistors R11 and R12 connected in series between an output terminal of the amplifier 35 and the second voltage VSS. Although not shown, at least one of the resistors R11 and R12 may be implemented by a variable resistor to control the level of the first feedback input voltage Vfd4.

The comparison block 33-2 may compare the feedback boosted voltage Vfd5 with the reference voltage Vr and output the comparison result. The comparison block 33-2 may include a second resistive divider 41 and a comparator 43.

The second resistive divider 41 may perform resistive division of an output boosted voltage AVDD3 at the output terminal in response to the comparison control signal FB_CONT and may output a resistively divided voltage as the feedback boosted voltage Vfd5. The second resistive divider 41 may include one or more resistors R15 and R16 and a control switch SW. The resistors R15 and R16 may be connected in series between the output voltage AVDD3 and a control node NC to resistively divide the output terminal voltage AVDD3 and output the resistively divided voltage as the feedback boosted voltage Vfd5. Although not shown, at least one of the resistors R15 and R16 may be implemented by a variable resistor to control the level of the feedback boosted voltage Vfd5. The control switch SW may be connected between the control node NC and the second voltage VSS to form an electrical path between the control node NC and the second voltage VSS in response to the comparison control signal FB_CONT.

The comparator 43 may compare the feedback boosted voltage Vfd5 with the reference voltage Vr and output the comparison result to the booster 45. The comparator 43 may also receive a comparison enable signal AMP_CONT and may be enabled or disabled in response to the comparison enable signal AMP_CONT. The comparison enable signal AMP_CONT may be generated by the controller 39 based on the input voltage control signal AB_VCI1 and the load detection signal HLOAD. In other words, the comparison enable signal AMP_CONT and the comparison control signal FB_CONT are used to enable or disable the operation of the comparison block 33-2 and may have the same logic level.

As shown in FIG. 6, the controller 39 may be implemented by a NAND gate NG and may output the comparison control signal FB_CONT and the comparison enable signal AMP_CONT in response to the input voltage control signal AB_VCI1 and the load detection signal HLOAD. In addition, the controller 39 may receive through an inverter IV a system enable signal STB_DSTB, which enables a system, for example, a display apparatus 100 illustrated in FIG. 11 where the boosted voltage generator 30 is implemented, and a boosted voltage generation enable signal PON, which enables the boosted voltage generator 30.

FIG. 7 is a table showing the definitions of the control signals input to the controller 39 shown in FIG. 5. Referring to FIG. 7, when the system enable signal STB_DSTB is input at a first logic level, for example, a high level of "1", a system, for example, the display apparatus 100 of FIG. 11, in which the boosted voltage generator 30 is implemented, may be in a standby state. When the system enable signal STB_DSTB is input at a second logic level, for example, a low level of "0", the system may be in an operation state. When the boosted voltage generation enable signal PON is input at a first logic level, for example, a high level of "1", the boosted voltage generator 30 may generate the boosted voltage AVDD3. When the boosted voltage generation enable signal PON is input at a second logic level, for example, a low level of "0", the boosted voltage generator 30 may not generate the boosted voltage AVDD3. When the input voltage control signal AB_VCI1 is input at a first logic level, for example, a high level of "1", the voltage generation block 33-1 may output the second input voltage VCI. When the input voltage control signal AB_VCI1 is input at a second logic level, for example, a low level of "0", the voltage generation block 33-1 may output the first input voltage VCI1. When the load detection signal HLOAD is a signal having a logic level corresponding to a load, for example, the TFT-LCD panel 120 illustrated in FIG. 11, the load detection signal HLOAD may have a first logic level, for example, a high level of "1", when the load is greater than a reference load and may have a second logic level, for example, a low level of "0", when the load is less than the reference load.

In other words, the controller 39 may output the comparison control signal FB_CONT and/or the comparison enable signal AMP_CONT in response to the system enable signal STB_DSTB, the boosted voltage generation enable signal PON, the input voltage control signal AB_VCI1, and the load detection signal HLOAD. The controller 39 may be implemented by a logic operator NG, as shown in FIG. 6. The logic operator NG may perform a logic operation on an inverted system enable signal, the boosted voltage generation enable signal PON, the input voltage control signal AB_VCI1, and the load detection signal HLOAD and may output a result of the logic operation as the comparison control signal FB_CONT and/or the comparison enable signal AMP_CONT. The logic operator NG shown in FIG. 6 may perform a NAND operation or an AND operation (not shown) and output a NAND or an AND operation result.

As shown in FIG. 5, the booster 45 may boost the first input voltage VCI1 or the second input voltage VCI using one or more external capacitors, for example, the first and second external capacitors C11 and C12, based on an output voltage of the input voltage generator 31 and the comparison result and may output a result of the boosting as the boosted voltage AVDD3 across the third external capacitor CAV3 at the output terminal. The third external capacitor CAVD3 is connected with an output terminal of the booster 45 to stabilize the voltage level of the boosted voltage AVDD3.

Figure 9:
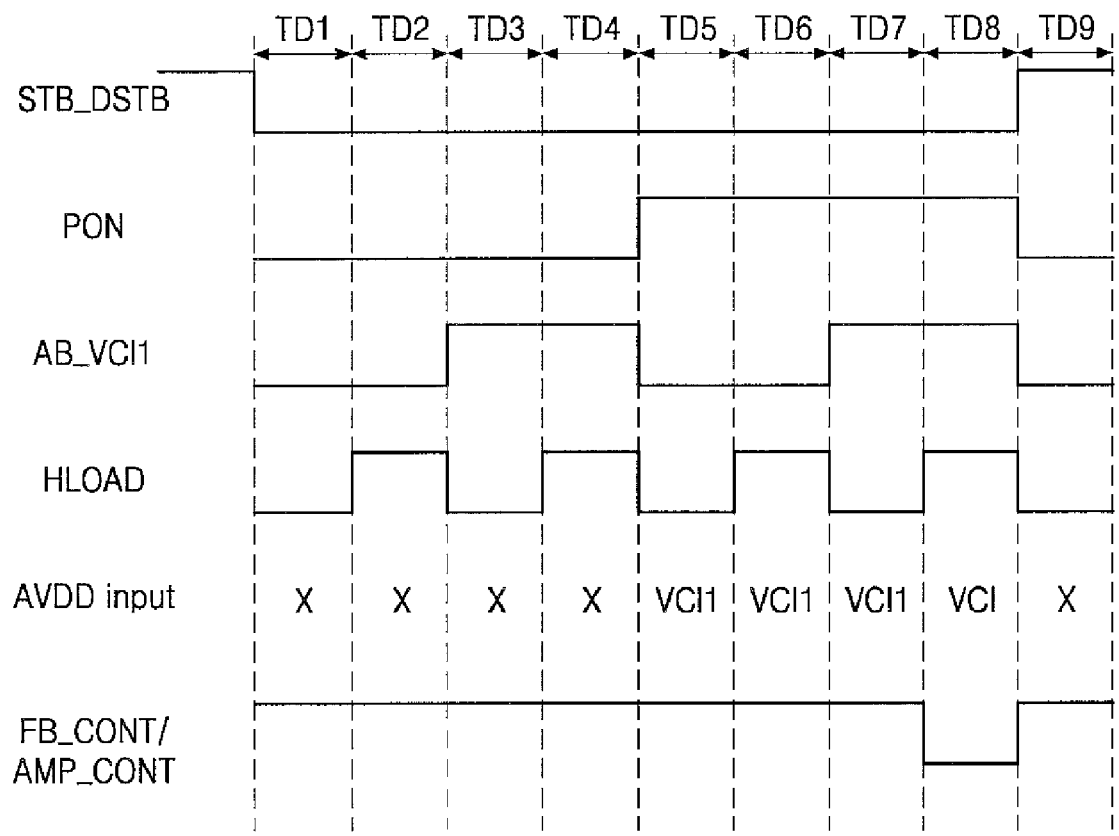
FIG. 9 is a timing chart illustrating the operations of the boosted voltage generator illustrated in FIG. 5.

FIG. 8 is a logic table showing the operations of the boosted voltage generator 30 illustrated in FIG. 5. FIG. 9 is a timing chart illustrating the operations of the boosted voltage generator 30 illustrated in FIG. 5. The operations of the boosted voltage generator 30 according to the operations of the controller 39 will be described in detail with reference to FIGS. 5 through 9.

During a period TD1 through a period TD4, the boosted voltage generator 30 does not generate the boosted voltage AVDD3 because the boosted voltage generation enable signal PON is at the second logic level, that is, the low level of "0". During a period TD5, the boosted voltage generator 30 generates the boosted voltage AVDD3 because the boosted voltage generation enable signal PON is at the first logic level, that is, the high level of "1". At this time, because the input voltage control signal AB_VCI1 is at the second logic level, that is, the low level of "0", the voltage generation block 33-1 generates the first input voltage VCI1 and the booster 45 boosts the first input voltage VCI1 and outputs a boosting result as the boosted voltage AVDD3 at the output terminal.

During a period TD6, as in the period TD5, the boosted voltage generator 30 generates the boosted voltage AVDD3 because the boosted voltage generation enable signal PON is at the first logic level, that is, the high level of "1", and the voltage generation block 33-1 generates the first input voltage VCI1 because the input voltage control signal AB_VCI1 is at the second logic level, that is, the low level of "0". At this time, the booster 45 boosts the first input voltage VCI1 and outputs a boosting result as the boosted voltage AVDD3 at the output terminal.

During a period TD7, the boosted voltage generator 30 generates the boosted voltage AVDD3 because the boosted voltage generation enable signal PON is at the first logic level, that is, the high level of "1", and the voltage generation block 33-1 generates the second input voltage VCI because the input voltage control signal AB_VCI1 is at the first logic level, that is, the high level of "1". At this time, the comparison block 33-2 outputs a comparison result in response to the control signals, for example, the comparison enable signal AMP_CONT and the comparison control signal FB_CONT, generated by the controller 39.

More specifically, during the period TD7, because the load detection signal HLOAD is at the second logic level, that is, the low level of "0", the control signals, that is, the comparison enable signal AMP_CONT and the comparison control signal FB_CONT, are at the first logic level, that is, the high level of "1". The comparison block 33-2 is disabled in response to the comparison enable signal AMP_CONT and the comparison control signal FB_CONT input at the first logic level, that is, the high level of "1". Then, the booster 45 boosts the second input voltage VCI and outputs a boosting result as the boosted voltage AVDD3.

During a period TD8, the boosted voltage generator 30 generates the boosted voltage AVDD3 because the boosted voltage generation enable signal PON is at the first logic level, that is, the high level of "1". The voltage generation block 33-1 generates the second input voltage VCI because the input voltage control signal AB_VCI1 is at the first logic level, that is, the high level of "1". At this time, the comparison block 33-2 outputs a comparison result in response to the control signals, that is, the comparison enable signal AMP_CONT and the comparison control signal FB_CONT generated by the controller 39.

In detail, during the period TD8, since the load detection signal HLOAD is at the first logic level, that is, the high level of "1", the control signals, that is, the comparison enable signal AMP_CONT and the comparison control signal FB_CONT are at the second logic level, that is, the low level of "0". The comparison block 33-2 is enabled in response to the comparison enable signal AMP CONT and the comparison control signal FB_CONT input at the second logic level, that is, the low level of "0". The booster 45 boosts the second input voltage VCI based on the comparison result output from the comparison block 33-2 and outputs a boosting result as the boosted voltage AVDD3. Therefore, the boosted voltage generator 30 according to the above-described exemplary embodiments of the present invention can increase boosting efficiency according to the amount of load.

During a period TD9, because the system enable signal STB DSTB is at the first logic level, that is, the high level of "1", a system where the boosted voltage generator 30 is implemented, for example, the display apparatus 100 of FIG. 11, is in the standby state and the boosted voltage generator 30 does not generate the boosted voltage AVDD3.

FIG. 10 shows the simulation results of an output voltage according to a load current in the boosted voltage generator 30 illustrated in FIG. 5. Referring to FIGS. 5 and 10, when the input voltage control signal AB_VCI1 is at the second logic level, that is, the low level of "0" and the voltage generation block 33-1 generates the first input voltage VCI1, and the load detection signal HLOAD is at the second logic level, that is, the low level of "0" and a panel is a low load panel, the boosted voltage generator 30 boosts the first input voltage VCI1 and outputs a boosting result as the boosted voltage AVDD3. In other words, when the boosted voltage AVDD3 is considered with respect to the low load panel in FIG. 10, the decrement of generation efficiency of the boosted voltage AVDD3 is small.

When the input voltage control signal AB_VCI1 is at the first logic level, that is, the high level of "1" and the voltage generation block 33-1 generates the second input voltage VCI, and the load detection signal HLOAD is at the first logic level, that is, the high level of "1" and a panel is a high load panel, the boosted voltage generator 30 boosts the second input voltage VCI and outputs a boosting result as the boosted voltage AVDD3. In other words, when the boosted voltage AVDD3 is considered with respect to the high load panel in FIG. 10, the decrement of generation efficiency of the boosted voltage AVDD3 is small.

FIG. 11 is a block diagram of the display apparatus 100 that can employ the boosted voltage generator 30 illustrated in FIG. 5. Referring to FIGS. 5 and 11, the display apparatus 100 may include a TFT-LCD panel 120, a display panel driving unit 130, and a flexible printed circuit (FPC) in which interconnection lines for connecting the TFT-LCD panel 120 with the display panel driving unit 130 and other external parts are installed.

The TFT-LCD panel 120 and the display panel driving unit 130 may be interconnected by the FPC, but the present invention is not restricted thereto. The TFT-LCD panel 120 may include a plurality of source lines or data lines (not shown), a plurality of gate lines or scan lines (not shown), and a plurality of pixels (not shown). The display panel driving unit 130 drives the plurality of source lines and the plurality of gate lines and the TFT-LCD panel 120 displays images through the plurality of pixels driven by the display panel driving unit 130.

The display panel driving unit 130 may include a source driver 132, a first gate driver 134, a second gate driver 136, a first memory unit 138, a second memory unit 140, a first power supply unit 142, a second power supply unit 144, and a logic unit 146, which although not shown are all interconnected. The source driver 132 may drive a source line among the plurality of source lines in the TFT-LCD panel 120 based on at least one voltage generated by the first power supply unit 142 or the second power supply unit 144.

Each of the first gate driver 134 and the second gate driver 136 may drive a gate line among the plurality of gate lines in the TFT-LCD panel 120 based on at least one voltage generated by the first power supply unit 142 or the second power supply unit 144. For instance, the first gate driver 134 may drive a first gate line among a first group of gate lines included in a first area (not shown) of the TFT-LCD panel 120 which is divided into N areas (where N is a natural number, for example, 2). The second gate driver 136 may drive a second gate line among a second group of gate lines included in a second area (not shown) of the TFT-LCD panel 120 which is divided into the N areas. The first gate driver 134 and the second gate driver 136 may be implemented together by a single gate driver.

The first memory unit 138 and the second, memory unit 140 may store data displayed on the TFT-LCD panel 120 or may store software for operating the logic unit 146. The first memory unit 138 and the second memory unit 140 may be implemented together by a single memory unit.

The first power supply unit 142 may generate at least one high voltage (not shown) in response to an external voltage (not shown). The second power supply unit 144 may generate a driving voltage, for example, a common voltage, used in the source driver 132, the first gate driver 134, and the second gate driver 136 based on at least one control signal, for example, the system enable signal STB_DSTB, the boosted voltage generation enable signal PON, the input voltage control signal AB VCI1, the load detection signal HLOAD, the comparison enable signal AMP_CONT, and the comparison control signal FB_CONT. The second power supply unit 144 may include the boosted voltage generator 30 illustrated in FIG. 5 and the boosted voltage AVDD3 generated by the boosted voltage generator 30 may be used as the driving voltage. The structure and the operations of the boosted voltage generator 30 have been described in detail with reference to FIGS. 5 through 10. Thus, further detailed descriptions thereof will be omitted. The first power supply unit 142 and the second power supply unit 144 may be implemented together by a single power supply unit employing the boosted voltage generator 30.

The logic unit 146 may control the operations of the source driver 132, the first gate driver 134, the second gate driver 136, the first memory unit 138, the second memory unit 140, the first power supply unit 142, and the second power supply unit 144 and generate the control signals, for example, the system enable signal STB_DSTB, the boosted voltage generation enable signal PON, the input voltage control signal AB_VCI1, the load detection signal HLOAD, the comparison enable signal AMP_CONT, and the comparison control signal FB_CONT.

Figure 12:
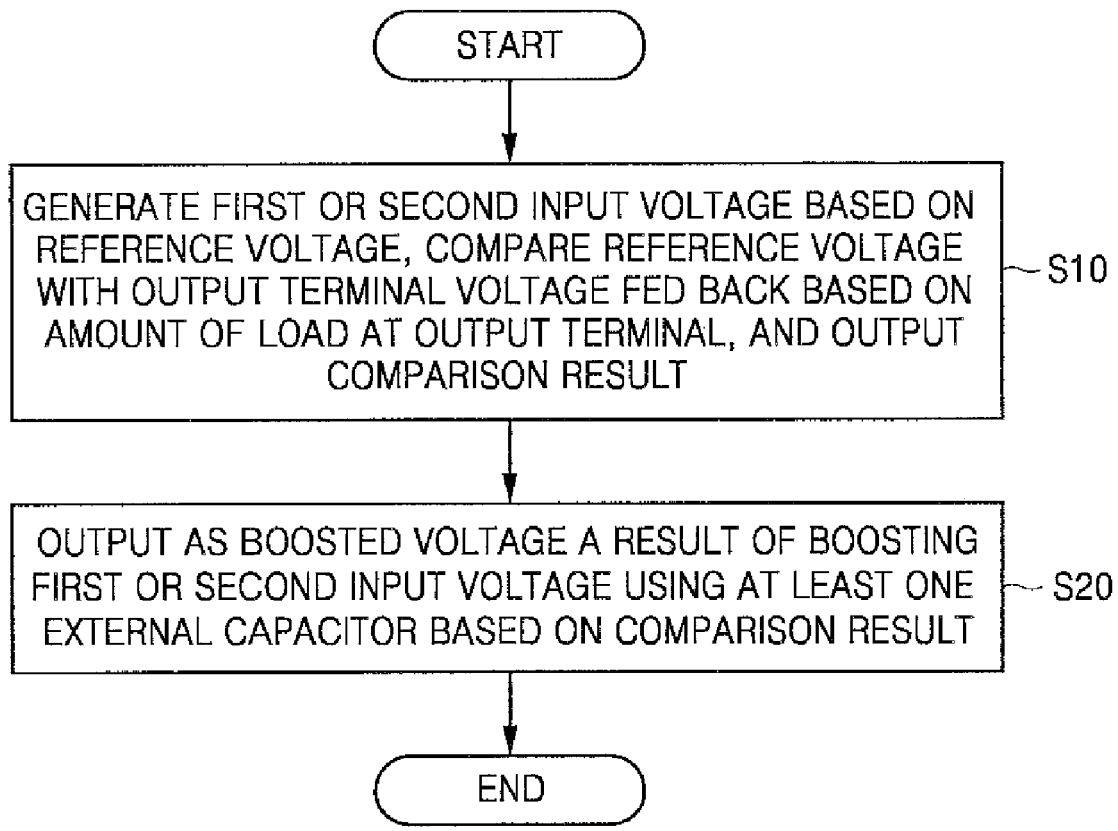
FIG. 12 is a flowchart of a method of generating a boosted voltage according to an exemplary embodiment of the present invention.

FIG. 12 is a flowchart of a method of generating a boosted voltage according to an exemplary embodiment of the present invention. Referring to FIGS. 5 and 12, the input voltage generator 31 generates the first input voltage VCI1 or the second input voltage VCI based on the reference voltage Vr, compares the reference voltage Vr with the feedback boosted voltage Vfd5 fed back based on the amount of load at the output terminal AVDD3, and outputs a comparison result in operation S10. The booster 45 boosts the first input voltage VCI1 or the second input voltage VCI using at least one external capacitor, for example, the first external capacitor C11 and the second external capacitor C12, based on the comparison result and outputs a boosting result as the boosted voltage AVDD3 in operation S20.

As described above, according to exemplary embodiments of the present invention, a boosted voltage generator can increase boosting efficiency according to the amount of load in a display apparatus. In addition, because an input voltage of a booster is selected according to the amount of load, a boosted voltage can be stably generated.

While the present invention has been particularly shown and described with reference to exemplary embodiments thereof, it will be understood by those of ordinary skill in the art that various changes in forms and details may be made therein without departing from the spirit and scope of the present invention, as defined by the following claims.

What is claimed is:

1. A boosted voltage generator comprising:
    a reference voltage generator configured to generate a reference voltage based on a first voltage;
    an input voltage generation block configured to amplify a difference between the reference voltage and a first feedback input voltage fed back via a load at the input voltage generation block output terminal and output a first input voltage, which corresponds to a voltage swinging between a second input voltage and a second voltage, or output the second input voltage in response to an input voltage control signal, to compare a feedback boosted voltage with the reference voltage in response to a comparison control signal, and to output a comparison result, where the comparison control signal is generated based on the input voltage control signal and a load detection signal corresponding to the amount of load at the output terminal; and
    a booster configured to boost the first or second input voltage using at least one external capacitor based on the comparison result and to output a boosting result as a boosted voltage to the output terminal.

2. The boosted voltage generator of claim 1, wherein the input voltage generation block comprises:
    a voltage generation block configured to amplify the difference between the reference voltage and the first feedback input voltage and output the first input voltage, which corresponds to the voltage swinging between the second input voltage and the second. voltage, or the second input voltage in response to the input voltage control signal;
    a comparison block configured to compare the feedback boosted voltage with the reference voltage in response to the comparison control signal and output the comparison result; and
    a controller configured to output the comparison control signal in response to the input voltage control signal and the load detection signal.

3. The boosted voltage generator of claim 2, wherein the voltage generation block comprises:
    an amplifier configured to amplify the difference between the reference voltage and the first feedback input voltage and output the first input voltage, which corresponds to the voltage swinging between the second input voltage and the second voltage, or the second input voltage in response to the input voltage control signal; and
    a resistive divider configured to resistively divide an output voltage of the amplifier and output a resistively divided voltage as the feedback first input voltage.

4. The boosted voltage generator of claim 2, wherein the comparison block comprises:
    a comparator configured to compare the feedback boosted voltage with the reference voltage and output the comparison result; and
    a resistive divider configured to resistively divide a voltage of the output terminal in response to the comparison control signal and output a resistively divided voltage as the feedback boosted voltage.

5. The boosted voltage generator of claim 4, wherein the comparator is enabled in response to a comparison enable signal and the controller outputs the comparison enable signal in response to the input voltage control signal and the load detection signal.

6. The boosted voltage generator of claim 2, wherein the load, detection signal has a first logic level when the amount of load at the output terminal is greater than a reference load.

7. The boosted voltage generator of claim 2, wherein the controller comprises a logic operator configured to perform a logic operation on the input voltage control signal and the load detection signal and output a result of the logic operation as the comparison control signal.

8. The boosted voltage generator of claim 7, wherein, the logic operation performs an AND operation or a NAND operation.

9. The boosted voltage generator of claim 2, wherein the reference voltage generator resistively divides the first voltage and outputs a resistively divided voltage as the reference voltage.

10. A display apparatus comprising:
a display panel comprising a plurality of source Lines and a plurality of gate lines; and
a display panel driving, unit comprising a source driver configured to drive a source line among the plurality of source lines and a power supply unit comprising a boosted voltage generator configured to venerate at least one boosted voltage needed by the source driver to drive the source line,
wherein the boosted voltage generator comprises:
a reference voltage generator configured to generate a reference voltage based on a first voltage;
an input voltage generation. block configured to amplify a difference between the reference voltage and a first feedback input voltage fed back via a load at the input voltage generator output terminal and output the first input voltage, which corresponds to a voltage swinging between the second input voltage and a second voltage, or output the second input voltage in response to an input voltage control signal, compare the feedback boosted voltage with the reference voltage in response to a comparison control signal, and output a comparison result, where the comparison control signal is generated based on the input voltage control signal and a load detection signal corresponding to the amount of load at the output terminal; and
a booster configured to boost the first or second input voltage using at least one external capacitor based on the comparison result and. output a boosting result as a boosted voltage to the Output terminal.

11. The display apparatus of claim 10, wherein the input voltage generation block comprises:
a voltage generation block configured to amplify the difference between the reference voltage and the first feedback input voltage and output the first input voltage, which corresponds to the voltage swinging between the second input voltage and the second voltage, or the second input voltage in response to the input voltage control signal:
a comparison block configured to compare the feedback boosted voltage with the reference voltage in response to the comparison control signal and output the comparison result; and
a controller configured to output the comparison control signal in response to the input voltage control signal and the load detection signal.

12. The display apparatus of claim 11, wherein the voltage generation block comprises:
an amplifier configured to amplify the difference between the reference voltage and the first feedback input voltage and output the first input voltage, which corresponds to the voltage swinging between the second input voltage and the second voltage, or the second input voltage in response to the input voltage control signal; and
a resistive divider configured to resistively divide an output voltage of the amplifier and output a resistively divided voltage as the feedback first input voltage.

13. The display apparatus of claim 11,wherein the comparison block comprises:
a comparator configured to compare the feedback boosted voltage with the reference voltage and output the comparison result; and
a resistive divider configured. to resistively divide a voltage of the output terminal in response to the comparison control signal and output a resistively divided voltage as the feedback boosted voltage.

14. The display apparatus of claim 13, wherein the comparator is enabled in response to a comparison enable signal and the controller outputs the comparison enable signal in response to the input voltage control signal and the load detection signal.

15. The display apparatus of claim 11, wherein the load detection signal has a first logic level when the amount of load at the output terminal is greater than a reference load, 16. The display apparatus of claim 11, wherein the controller comprises a logic operator configured to perform a logic operation on the input voltage control signal and the load detection signal and output a result of the logic operation as the comparison control signal.

17. The display apparatus of claim 16, wherein the logic operation performs an AND operation or a NAND operation.

18. The display apparatus of claim 11, wherein the reference voltage generator resistively divides the first voltage and outputs a resistively divided voltage as the reference voltage.

* * * * *